Oct. 4, 1932.   C. A. DE GIERS   1,881,264
LIQUID LEVEL INDICATOR
Filed July 10, 1929   2 Sheets-Sheet 1
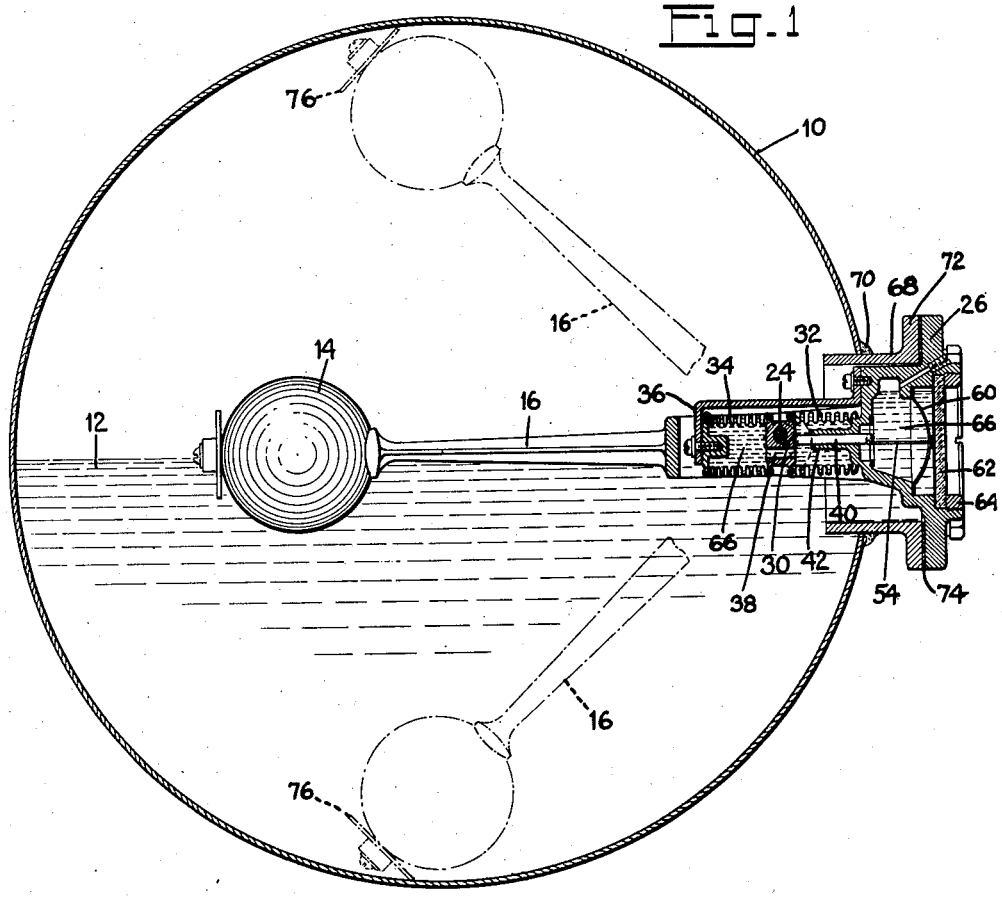
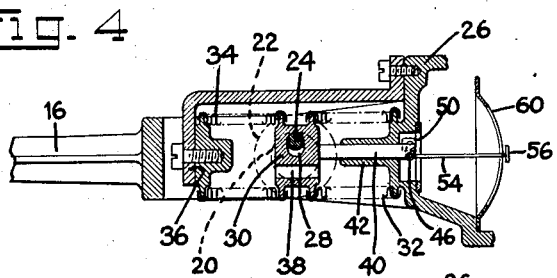
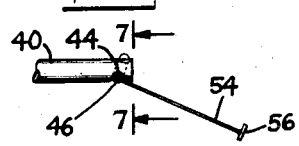
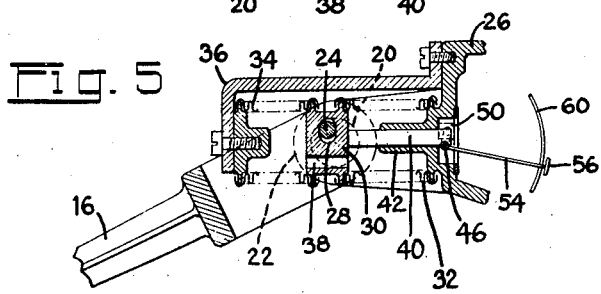
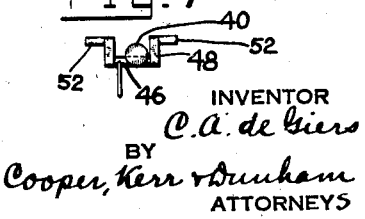
INVENTOR
C. A. de Giers
BY
Cooper, Kerr & Dunham
ATTORNEYS Oct. 4, 1932.  C. A. DE GIERS  1,881,264
LIQUID LEVEL INDICATOR
Filed July 10, 1929   2 Sheets-Sheet 2
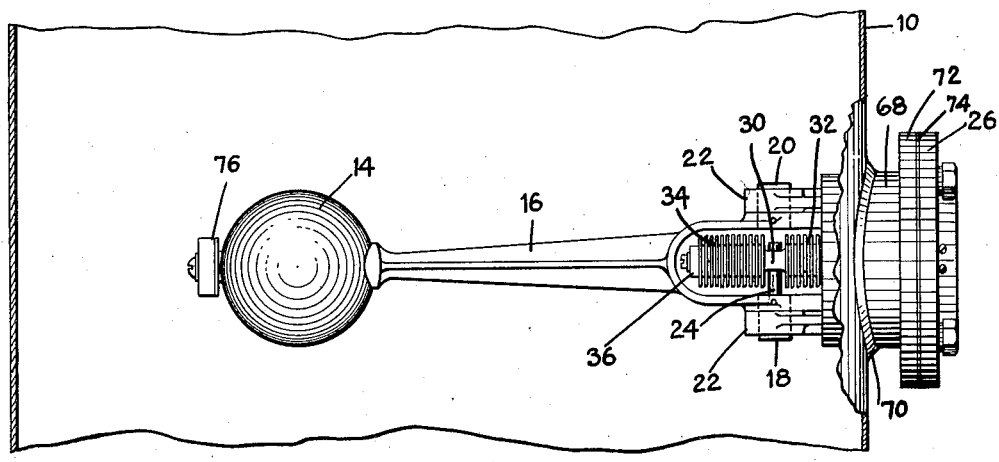
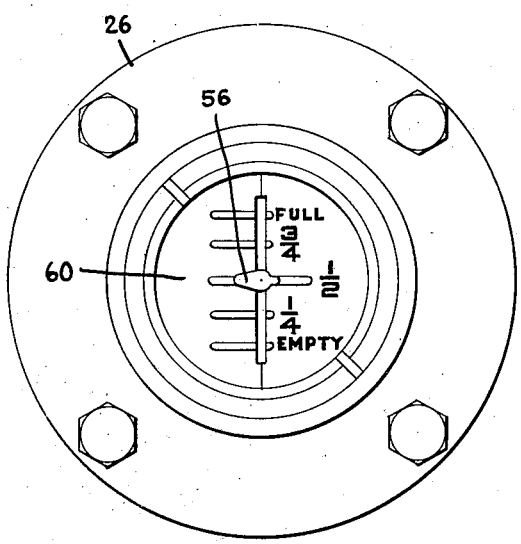

Patented Oct. 4, 1932

1,881,264

UNITED STATES PATENT OFFICE

CLARENCE A. DE GIERS, OF FOREST HILLS, NEW YORK, ASSIGNOR TO LIQUIDOMETER CORPORATION, OF LONG ISLAND CITY, NEW YORK, A CORPORATION OF DELAWARE

LIQUID LEVEL INDICATOR

Application filed July 10, 1929. Serial No. 377,086.

The object of the present invention is to provide an improved design of device suitable for attachment to tanks, for indicating the level of liquid in the tank. The device herein described is especially suitable for severe service, such for instance as is encountered in connection with water tanks carried underneath Pullman cars.

The device is arranged for attachment direct to the tank, is simple and substantial, and thoroughly protects the more delicate parts of the apparatus from abuse or injury, either from outside sources or from the tank contents.

Further and other objects and advantages will be apparent from the specification and claim, and from the drawings which show by way of illustration what is now considered the preferred embodiment of the invention.

Fig. 1 is a vertical cross-section of the device in position in a tank, with float in horizontal position.

Fig. 2 is a view of the device in Fig. 1, taken from beneath.

Fig. 3 is an enlarged view of the face of the device, taken from the right of Fig. 1.

Fig. 4 is an enlarged cross-section showing details of the operative mechanism of the device with parts in the same position as in Fig. 1.

Fig. 5 is a view similar to Fig. 4 but with the parts in the positions assumed when the float is at the bottom of the tank.

Fig. 6 is an enlarged fragmentary view showing the pointer and its connection to the rod that actuates it.

Fig. 7 is a view on line 7—7 of Fig. 6.

In the drawings the tank is designated 10, and it is shown in Fig. 1 as being partly filled with liquid 12, upon the surface of which rests a float 14 carried on the free end of an arm 16. The other end of arm 16 is bifurcated and is provided with trunnion pins 18 and 20, by means of which the arm is pivoted to arms 22 of the device. Pins 18 and 20 are fast in arm 16 and rotate in bracket arms 22. Projecting horizontally from trunnion 18 at a point removed from the center line thereof, is a pin 24. It will be appreciated that this pin will move like a crank pin about the axis of pins 18 and 20, whenever those pins are rotated by the movement of the float. Bracket arms 22 are integral with body casting 26.

Pin 24 passes through a slot 28 in a yoke 30. Attached to the sides of the yoke and projecting horizontally therefrom are sylphons 32 and 34, the other ends of the sylphons being connected to body 26 and to bracket 36 respectively, the bracket being bolted rigidly to body 26. The sylphons are sealed at their ends so as to be liquid tight, but they are interconnected by a passage 38 through the yoke.

Projecting horizontally from the yoke is a rod 40, which passes through a guide sleeve 42 and has its free end in the hollow interior of body 26.

With the above in mind it will be clear that as the float rises and falls with the change of level of liquid 12, yoke 30 will be moved horizontally by crank pin 24, and the free end of rod 40 will always assume a certain definite position for every position of the float. In order to visually indicate those positions the end of rod 40 is used to actuate an indicator, as follows.

The lower side of rod 40 is provided with a notch 44, which engages crank pin 46 of a crank shaft 48, best shown in Fig. 7. This shaft is mounted within body 26 by means of a fitting 50, in which fitting shaft 48 is supported for rotation on its journals 52. Attached to crank pin 46, adjacent rod 40, is a wire 54 bearing on its outer end a pointer 56. When rod 40 moves longitudinally under the influence of the float, shaft 48 is rotated on its journals 52, whereupon pointer 56 is moved with relation to a graduated chart 60, substantially arcuate shape, to indicate on the chart the position of the float, or, as shown in Fig. 3, the amount of liquid in the tank. Figs. 1, 3 and 4 show the positions of parts when the tank is half full, while Fig. 5 shows their positions when the tank is empty.

In front of the pointer and chart is a glass face 62, held in position by threaded ring 64 screwed into body 26. Suitable packing between glass and body serves to render liquid tight the interior of body 26. The sylphons are also sealed against leakage, and since they are connected through sleeve 42 with the interior of body 26 the result is that all the delicate parts of the apparatus are operating in a sealed chamber out of reach of the liquid in the tank or of outside liquids, gases, or other agencies liable to injure the parts. The arrangement also prevents change of pressure in the tank from interfering with the proper operation of the apparatus.

It is customary to fill the sylphons and body with glycerine or other suitable liquid 66 to prevent condensation of moisture on the interior of glass 60.

To permit easy installation and removal of the device the tank is provided with a tubular inlet opening 68 welded into the wall of the tank as at 70 and flanged as at 72. The flange of body 26 is bolted to flange 72 with packing 74 between to prevent leakage of liquid 12. The opening through tube 68 is large enough to pass float 14.

To avoid contact of the float with the top or bottom of the tank the float is provided with a stop plate 76 which engages the tank as shown in the dotted float positions in Fig. 1.

It is to be understood that the invention is not limited to the specific embodiment herein illustrated and described but may be used in other ways without departure from its spirit as defined by the following claim.

I claim—

In apparatus of the class described, in combination with a tank adapted to contain liquid, a float adapted for movement by said liquid, a yoke, a sylphon adapted to support said yoke, means operatively interconnecting said float and said yoke whereby longitudinal movement of said yoke occurs when the float is moved by the liquid, a chart, a pointer adapted for movement relatively to said chart, and means interconnecting said yoke and said pointer whereby said pointer indicates on said chart the position of said float in the tank, said interconnecting means comprising a rod and a crank, said pointer being attached to said crank and said rod operating to move said crank whereby said pointer is moved relatively to said chart.

In testimony whereof I hereto affix my signature.

CLARENCE A. de GIERS.